United States Patent
Jung

(10) Patent No.: US 7,155,774 B2
(45) Date of Patent: Jan. 2, 2007

(54) LOCKING DEVICE FOR EXTENSION PIPE OF VACUUM CLEANER

(75) Inventor: Joo-Suck Jung, Gwangju (KR)

(73) Assignee: Samsung Gwangju Electronics Co., Ltd, Gwangju (KR)

( * ) Notice: Subject to any disclaimer, the term of this patent is extended or adjusted under 35 U.S.C. 154(b) by 477 days.

(21) Appl. No.: 10/645,156

(22) Filed: Aug. 21, 2003

(65) Prior Publication Data

US 2004/0123418 A1 Jul. 1, 2004

(30) Foreign Application Priority Data

Dec. 27, 2002 (KR) ............. 10-2002-0085337

(51) Int. Cl.
*A47L 9/24* (2006.01)
*A47L 9/32* (2006.01)

(52) U.S. Cl. ........................... 15/414; 285/7

(58) Field of Classification Search ............ 15/327.1, 15/327.2, 327.3, 327.4, 327.5, 327.6, 327.7, 15/414, 144.3, 144.4; 16/113, 429; 285/7, 285/145.1

See application file for complete search history.

(56) References Cited

U.S. PATENT DOCUMENTS

2002/0063427 A1* 5/2002 Schiemann et al. ......... 285/316

FOREIGN PATENT DOCUMENTS

| DE | 3931639 | | 4/1991 |
|---|---|---|---|
| EP | 0 727 172 | * | 8/1996 |
| GB | 2324712 | | 4/1998 |
| GB | 2 324 712 | | 11/1998 |
| JP | 9-253013 | | 9/1997 |
| JP | 9253013 | | 9/1997 |
| JP | 2002-17631 | * | 1/2002 |
| JP | 2002-209817 | * | 7/2002 |

OTHER PUBLICATIONS

Spanish Patent Office State of the Art issued on Jul. 28, 2005 for Spanish Application No. 200302306.

* cited by examiner

Primary Examiner—Terrence R. Till
(74) Attorney, Agent, or Firm—Ohlandt, Greeley, Ruggiero & Perle, L.L.P.

(57) ABSTRACT

A locking device for an extension pipe of a vacuum cleaner is provided that has a holder having first and second connection parts formed at both ends, and a locking hole in correspondence to a fixing hole formed in the extension pipe. The first and the second connection parts are connected to the operation handle and the extension pipe, respectively, and the locking hole is formed at a side of the second connection part. A cap is connected to an outer surface of the second connection part of the holder, and has an elastic locking member integrally formed therein and elastically biased toward the locking direction.

4 Claims, 3 Drawing Sheets

LOCKING DEVICE FOR EXTENSION PIPE OF VACUUM CLEANER

BACKGROUND

1. Field of the Invention

The present invention relates to a locking device for an extension pipe of a vacuum cleaner.

2. Description of the Related Art

FIG. 1 shows a conventional vacuum cleaner. As shown in FIG. 1, the conventional vacuum cleaner includes a cleaner body 1 where main parts such as vacuum generating unit are mounted, a flexible hose assembly 10 connected to the cleaner body 1 and including an operation handle 11, a brush assembly 20 moving along a surface to be cleaned and having an extension pipe 21 connected to the operation handle 11, and an extension pipe locking device 30 for removably supporting the operation handle 11 and the extension pipe 21.

The extension pipe locking device 30 enables use of various auxiliary brushes (not shown) so that cleaning of various places such as recess of the room is enabled. More specifically, the extension pipe locking device 30 maintains connection of the brush assembly 20 or an auxiliary brush with the operation handle 11, while also enabling easy removal thereof.

FIG. 2 is a partial cutaway sectional view showing a conventional extension pipe locking device for a vacuum cleaner. As shown in FIG. 2, the conventional extension pipe locking device includes a holder 40, a locking member 50, an elastic member 60 and a cap 70.

The holder 40 is configured as a hollow pipe, with first and second connection parts 41, 42 formed at both ends thereof. The first and second connection parts 41, 42 are connected to the operation handle 11 and the extension pipe 21, respectively. The second connection part 42 of the holder 40 has a locking hole 42a formed in correspondence with a fixing hole 21a of the extension pipe 21.

The locking member 50 has a hook 51 which is protruded into the second connection part 42 through the locking hole 42a, and a button part 52 extended from the hook 51. The locking member 50 is pivotally disposed on the outer surface of the holder 40 to pivot on an axis 80. At a side of the hook 51 is formed an inclined surface 51a which is formed at a predetermined angle.

The elastic member 60 elastically bias the locking member 50 so that the locking member 50 can pivot counter-clockwise with respect to the axis 80. Accordingly, the locking member 50 is maintained in the locked state, with the hook 51 being kept in an inserted state in the locking hole 42a. A compression coil spring is usually used for the elastic member 60.

The cap 70 is connected to the outer surface of the holder 40 to cover the elastic member 60 and the hook 51 and the axis 80 of the locking member 50. As a result, the respective parts are completely covered, and the recovery force of the elastic member 60 can be reinforced.

In the conventional locking device for an extension pipe of the vacuum cleaner constructed as above, with the button part 52 of the locking member 50 pressed in a state that the extension pipe is in locked state (see FIG. 2), the locking member 50 rotates about the axis 80 in the clockwise direction, and as a result, the hook 51 is unhooked from the fixing hole 21a of the extension pipe 21. Accordingly, the locking state is released, and the extension pipe 21 is separated.

After the separation of the extension pipe 21, because of the recovery force of the elastic member 60, the locking member 50 maintains an initial state, with the hook 51 being inserted in the locking hole 42a. Then as the extension pipe 21 is re-inserted to the second connection part 42 of the holder 40, the extension pipe 21 gets interfered with the hook 51, resulting the locking member 50 rotating about the axis 80 in the clockwise direction. As the extension pipe 21 is inserted to a position where the fixing hole 21a of the extension pipe 21 aligns with the locking hole 42a of the holder 40, the hook 51 is inserted in the fixing hole 21a through the locking hole 42a by the recovery force of the elastic member 60, locking the extension pipe 21. Meanwhile, the extension pipe 21 is smoothly inserted due to the presence of the inclined surface 51a of the hook 51.

However, according to the conventional locking device for an extension pipe of the vacuum cleaner, because there are the requirements for additional parts such as the locking member 50 having the hook 51 and the button part 52 integrally formed with the hook 51, and the elastic member 60 to return the locking member 50 to the initial position, the number of parts is increased, while assembling process also becomes complex. Accordingly, there was a need for an improvement.

SUMMARY

An object of the invention is to solve at least the above problems and/or disadvantages and to provide at least the advantages described hereinafter. Accordingly, it is an aspect of the present invention to provide a locking device for an extension pipe of a vacuum cleaner, which requires a less number of parts and simple assembly process.

In order to accomplish the above object and/or other features of the present invention, there is provided a locking device for an extension pipe of a vacuum cleaner, including a holder comprising a first and a second connection parts formed at both ends, and a locking hole in correspondence to a fixing hole formed in the extension pipe, the first and the second connection parts being connected to the operation handle and the extension pipe, respectively, and the locking hole being formed at a side of the second connection part, a cap connected to an outer surface of the second connection part of the holder, and comprising an elastic locking member integrally formed therein and elastically biased toward the locking direction, the elastic locking member having a hook protruded from the inside of the holder through the locking hole into the second connection part to thereby lock the extension pipe, and an unlocking leer pivotally disposed on the outer surface of the holder to be pivoted on an axis, and comprising an operation end being connected with a free end of the elastic locking member and a user operation button part extended from the operation end.

The holder may be formed to have a pipe shape. However, this is only a preferred example, and the holder may have different shapes according to the shape of either the extension pipe of the operation handle which may be formed in various sections.

According to the preferred embodiment of the preset invention, there is provided a first bracket integrally formed on the holder to support the axis.

According to another preferred embodiment of the present invention, there is provided a second bracket integrally formed on the cap to support the axis.

According to yet another preferred embodiment of the present invention, there are provided a third and a fourth brackets in a crossing manner on the holder and the cap, respectively, to support the axis.

According to yet another preferred embodiment of the present invention, an elastic member may be further provided for elastically biasing the elastic locking member in a locking direction. The elastic member may be a compression coil spring.

BRIEF DESCRIPTION OF THE DRAWINGS

The above aspects and other features of the present invention will become more apparent by describing in detail a preferred embodiment thereof with reference to the attached drawings, in which.

DETAILED DESCRIPTION OF THE PREFERRED EMBODIMENT

Hereinafter, the present invention will be described in detail with reference to the accompanying drawings.

Figure 1:
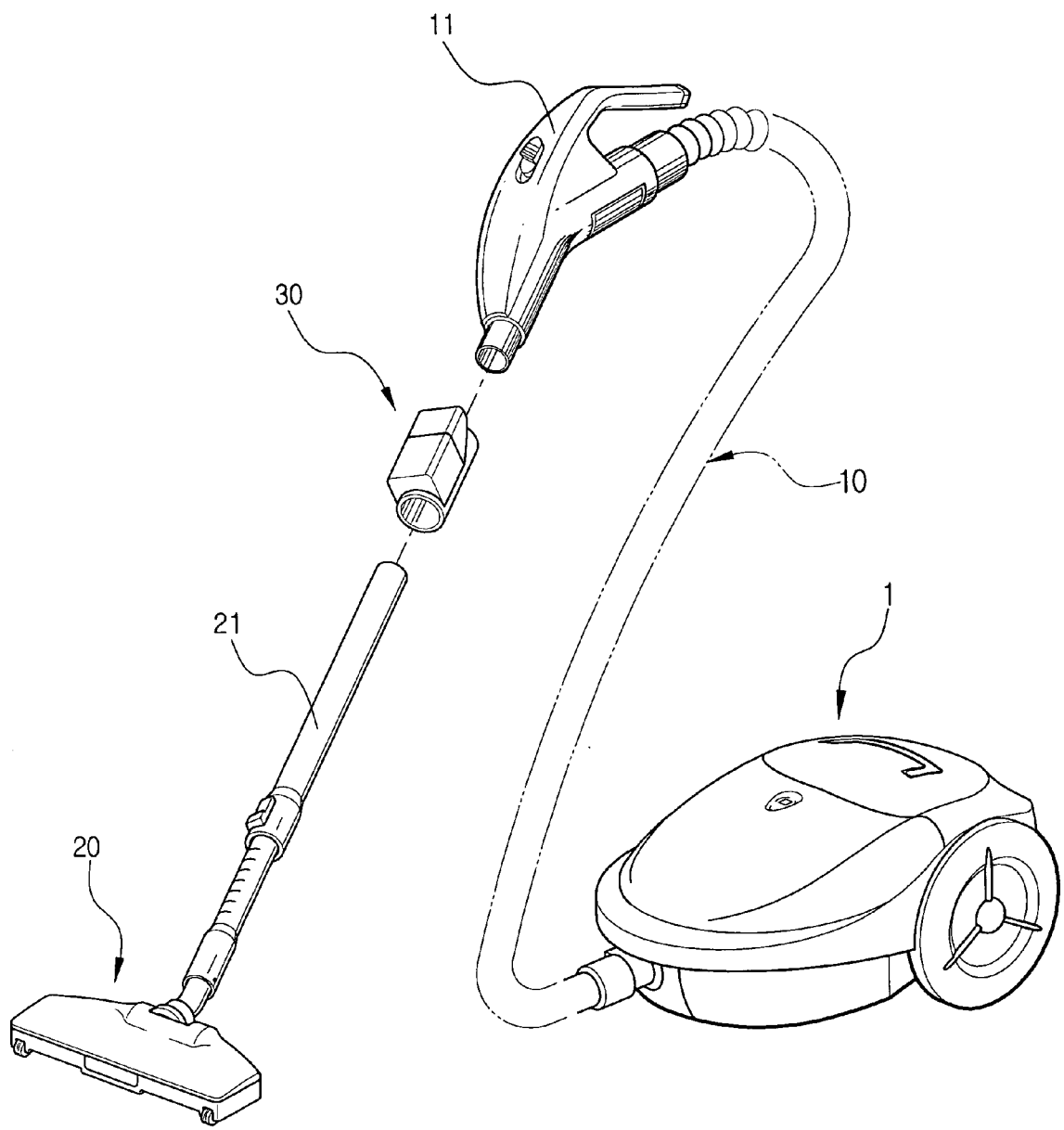
FIG. 1 is a perspective view of a conventional vacuum cleaner.
Figure 2:
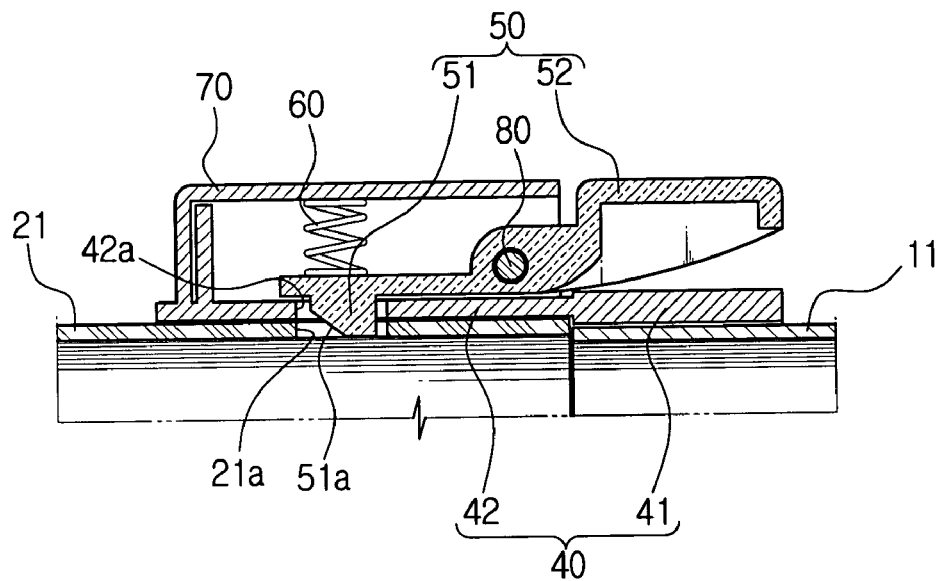
FIG. 2 is a partial cutaway sectional view illustrating a conventional locking device for an extension pipe of a vacuum cleaner.
Figure 3:
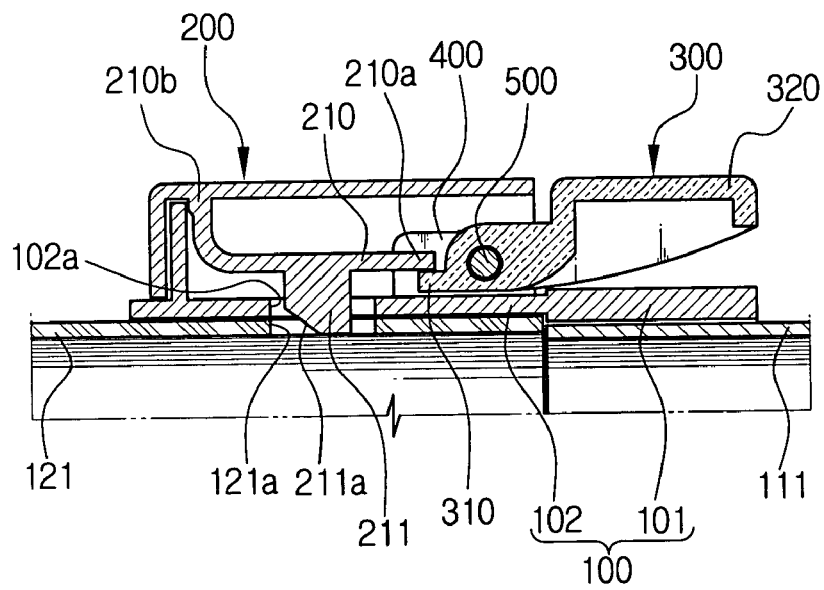
FIG. 3 is a partial cutaway sectional view illustrating a locking device for an extension pipe of a vacuum cleaner according to a preferred embodiment of the present invention.

FIG. 3 is a partial cutaway sectional view illustrating a locking device for an extension pipe of a vacuum cleaner according to a first preferred embodiment of the present invention.

Referring to FIG. 3, the locking device according to the first preferred embodiment of the present invention includes a holder 100, a cap 200 and an unlocking lever 300.

The holder 100 is configured as a hollow pipe, with first and second connection parts 101, 102 being formed at both ends thereof. The first and second connection parts 101, 102 are connected to the operation handle 111 and the extension pipe 121, respectively. The second connection part 102 of the holder 100 has a locking hole 102a formed in correspondence with a fixing hole 121a of the extension pipe 121. Although the holder 100 is depicted in the form of a hollow pipe in this embodiment by way of preferred example, the holder 100 may also be formed differently so as to have the same section as that of the extension pipe 121 and the operation handle 111 which may have various shaped sections such as a rectangle.

The cap 200 is connected to the outer surface of the second connection part 102 of the holder 100. Inside the cap 200, there is a resilient locking member 210 which is integrally formed to be resiliently biased toward the locking direction. The resilient locking member 210 has a hook 211 which is protruded through the locking hole 102a to the inside of the second connection part 102 to thereby lock the extension pipe 121. The hook 211 has an inclined surface 211a formed on a side at a predetermined angle.

By the user, the unlocking lever 300 unlocks the extension pipe from the hook 211 of the resilient locking member 210. The unlocking lever 300 is pivotally formed on a firs bracket 400 at an outer side of the holder 100 to be pivoted about an axis 500. The unlocking lever 300 has at one end an operation end 310 which is contacted with, and more specifically, locked in the lower portion of the free end 210a of the resilient locking member 210. There is an operation button part 320 formed at the other end of the unlocking lever 300.

With the locking device for an extension pipe of the vacuum cleaner constructed as above according to the preferred embodiment of the present invention, as the button part 320 is pressed in a state that the extension pipe 121 is in locked state (see FIG. 3), the unlocking lever 300 rotates about the axis 500 in the clockwise direction, subsequently causing the resilient locking member 210 connected with the operation end 310 of the unlocking lever 300 to rotate on the fixed end 210b in the counterclockwise direction. As a result, the hook 211 is separated from the fixing hole 121a of the extension pipe 121, and the extension pipe 121 is unlocked. Then the extension pipe 121 is separated from the holder 100. As the extension pipe 121 is separated and as the external force which has been exerted on the button part 320 is removed, the resilient locking member 210 is returned by its recovery force to the initial position, where the hook 211 is passed through the locking hole 102a into the second connection part 102. The locking device has an elastic member 600 for elastically biasing the locking member 210 in a locking direction. The elastic member 600 is a compression coil spring.

Meanwhile, in order to re-connect the extension pipe 121, the extension pipe 121 is re-inserted in the second connection part 102 of the holder 100. By the insertion of the extension pipe 121, the hook 211 is pressed into the extension pipe 121. The extension pipe 121 is smoothly inserted due to the present of the inclined surface 211a of the hook 211. As the extension pipe 121 is inserted to a position where the fixing hole 121a thereof is aligned with the locking hole 102a of the holder 100, the resilient locking member 210 is rotated by its recovery force about the fixed end 210b in the clockwise direction, causing the hook 211 to protrude through the locking hole 102a of the holder 100. Accordingly, the hook 211 is locked in the fixed hole 121a of the extension pipe 121, securely locking the extension pipe 121.

Figure 4:
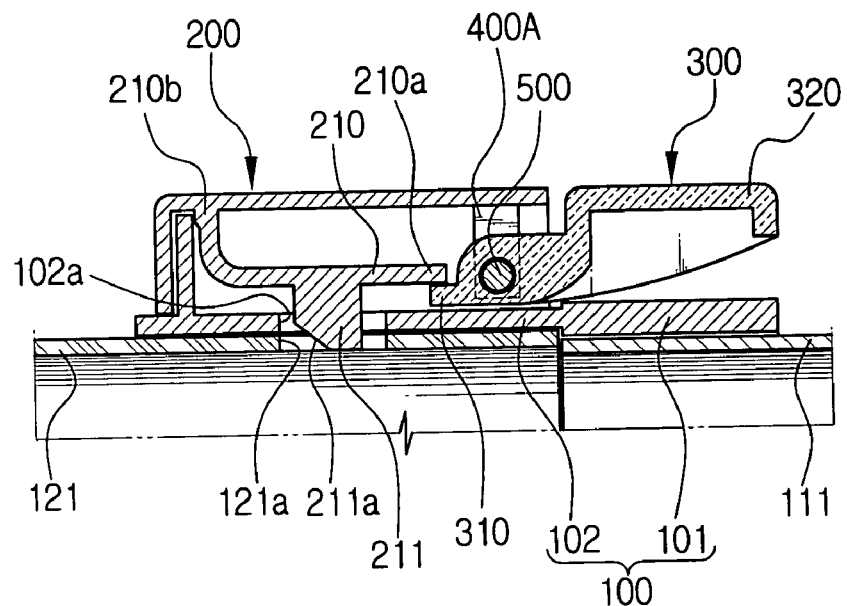
FIG. 4 is a partial cutaway sectional view illustrating a locking device for an extension pipe of a vacuum cleaner according to another preferred embodiment of the present invention.

FIG. 4 is a partial cutaway view illustrating a locking device for an extension pipe of a vacuum cleaner according to a second preferred embodiment of the present invention. As shown in FIG. 4, the second embodiment is similar to the first embodiment in basic structure. The difference of the second embodiment lies in a second bracket 400A which is provided at a side of the cap 200 to support the axis 500 of the unlocking lever 300.

Figure 5:
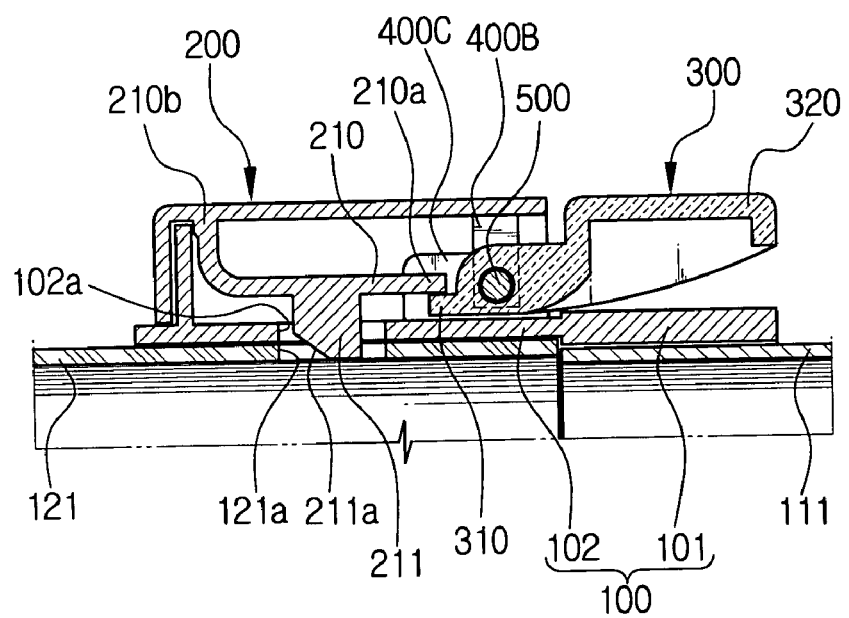
FIG. 5 is a partial cutaway sectional view illustrating a locking device for an extension pipe of a vacuum cleaner according to yet another preferred embodiment of the present invention.

FIG. 5 is a partial cutaway view illustrating a locking device for an extension pipe of a vacuum cleaner according to a third preferred embodiment of the present invention. The third embodiment is also similar to the first embodiment in basic structure, except the fact that there are third and fourth brackets 400B, 400C provided at the cap 200 and the holder 100 in a crossing manner, to support the axis 500 of the unlocking lever 300.

The detailed description of the second and the third embodiments respectively shown in FIGS. 4 and 5 will be omitted here, while the elements that are similar or identical to the elements of the first embodiment shown in FIG. 3 are designated with the same reference numerals.

Meanwhile, albeit not shown, according to another preferred embodiment, the locking device for an extension pipe of the vacuum cleaner may be additionally provided with an elastic member such as a compression coil spring which elastically supports the resilient locking member 210 in the locking direction.

According to the present invention, the locking device is constructed of a simple structure which has a cap having a holder and a resilient locking member integrally formed with the holder, and an unlocking lever. As a result, a number of parts is reduced, assembling process becomes more efficient and manufacturing cost decreases.

Although a few preferred embodiments of the present invention have been illustrated and described, it will be understood by those skilled in the art that the present invention should not be limited to the described preferred embodiments, but various changes and modifications can be made within the spirit and scope of the present invention as defined by the appended claims.

What is claimed is:

1. A locking device for an extension pipe of a vacuum cleaner, for removably supporting the extension pipe of a brush assembly being selectively connected to an operation handle of a flexible hose assembly which is connected to a cleaner body, the locking device comprising:

a holder comprising a first and a second connection parts formed at both ends, and a locking hole in correspondence to a fixing hole formed in the extension pipe, the first and the second connection parts being connected to the operation handle and the extension pipe, respectively, and the locking hole being formed at a side of the second connection part;

a cap connected to an outer surface of the second connection part of the holder, and comprising an elastic locking member integrally formed therein and elastically biased toward the looking direction, the elastic locking member having a hook protruded from the inside of the holder through the locking hole into the second connection part and inserted in the fixing hole of the extension pipe through the locking hole to thereby lock the extension pipe; and an unlocking lever pivotally disposed on the outer surface of the holder to be pivoted on an axis, and comprising an operation end being connected with a free end of the elastic locking member and separating the hook from the fixing hole of the extension pipe and a user operation button part extended from the operation end, wherein there are provided a first bracket integrally formed on the holder and a second bracket integrally formed on the cap to support the axis, wherein there are provided together a third bracket integrally formed on the cap to support the axis and a fourth bracket integrally formed on the holder to support the axis.

2. The locking device of claim 1, wherein the holder is configured in the form of a hollow pipe.

3. The locking device of claim 1, further comprising an elastic member for elastically biasing the elastic locking member in a locking direction.

4. The locking device of claim 3, wherein the elastic member is a compression coil spring.

* * * * *